Nov. 30, 1965  A. J. MECONE ETAL  3,220,114
DIRECT READING HEIGHT GAUGE
Filed Oct. 15, 1963  2 Sheets-Sheet 1
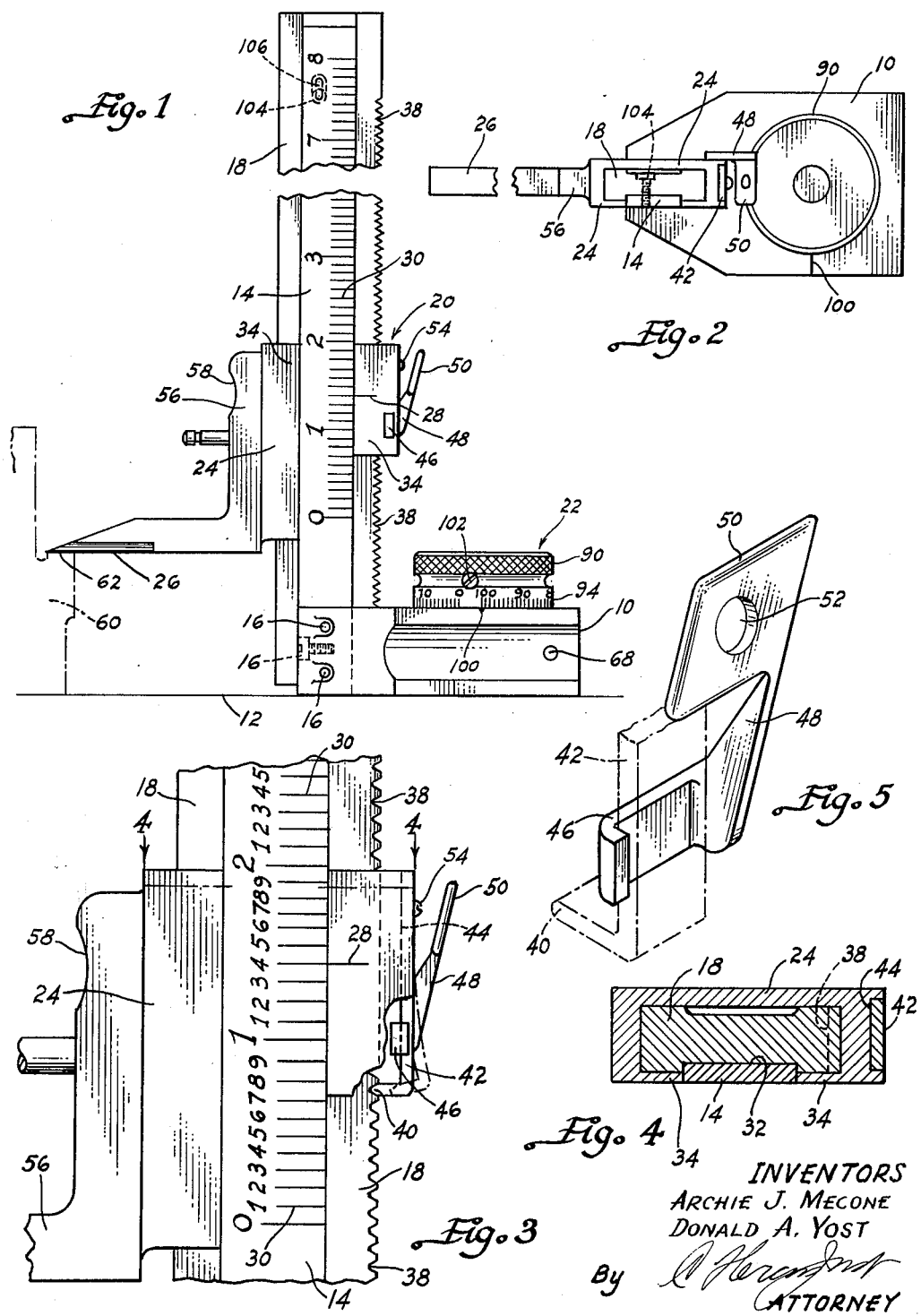
INVENTORS
ARCHIE J. MECONE
DONALD A. YOST
By
ATTORNEY

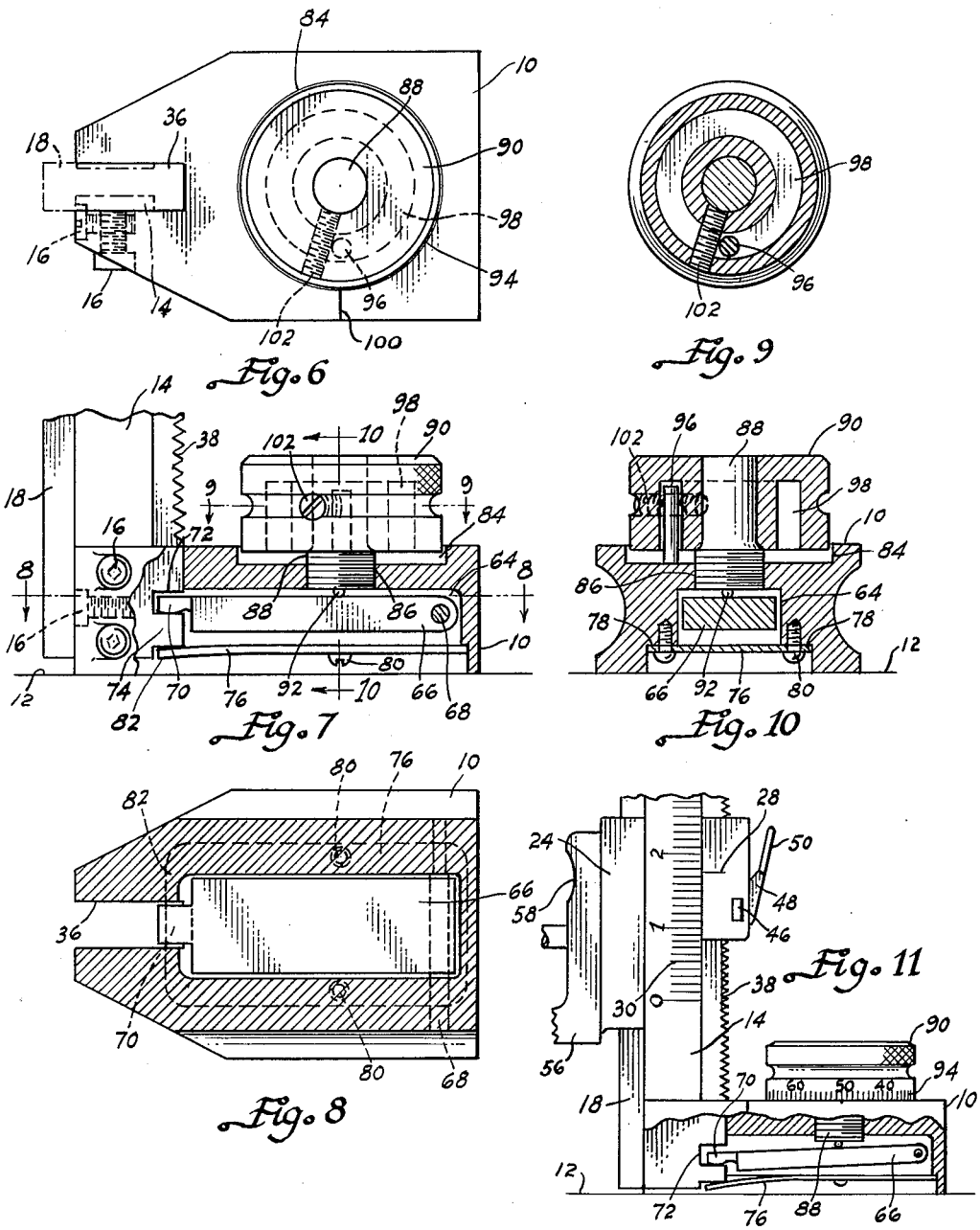

United States Patent Office 3,220,114
Patented Nov. 30, 1965

3,220,114
DIRECT READING HEIGHT GAUGE
Archie J. Mecone, R.F.D. 1, and Donald A. Yost, 1343 Catherine St., both of Williamsport, Pa.
Filed Oct. 15, 1963, Ser. No. 316,226
10 Claims. (Cl. 33—170)

This invention relates to improvements in a precision type measuring instrument known as a height gauge which is used by machinists, tool makers, and mechanics for measuring distances from a known reference point or surface which may be vertical, horizontal or otherwise. More particularly, the invention pertains to a height gauge of the type by which the desired dimension can be read directly through the expedient of a main scale which provides divisions of measurement $1/10''$, and an auxiliary scale, preferably reading in increments of at least $1/1000''$, by which a very precise measurement can be derived, all without the aid of verniers, rolling gears, screw clamps, or the like.

Height gauges have been devised heretofore which embody certain characteristics of micrometer-type measuring mechanisms, whereby it usually is necessary to revolve the rotating member of the measuring mechanism quite a number of revolutions and then take a reading on a micrometer-type scale on the mechanism. The position of these scales under such circumstances generally is such that reading the same is awkward and inconvenient.

It is the principal purpose of the present invention to provide a height gauge readily capable of having the distances measured thereby directly readable, simply by means of the naked eye and without requiring verniers or the like, a primary reading being afforded by a quickly settable slide on a main scale, while the final precise measurement is achieved through the maximum rotation of less than a complete revolution of a knob upon which an auxiliary scale, reading at least in thousandths of an inch, is positioned for ready reading, relative to a permanent reference point viewable preferably and conveniently from the upper surface of the base of the gauge.

Another object of the invention is to provide fool-proof and wear-resisting means by which a frame or slide which carries an indicating finger is moved vertically, for example, with reference to the main scale by means automatically loading said frame or slide for movement in one vertical direction, against the action of which the aforementioned precision measuring mechanism reacts for purposes of obtaining the final, precise reading of the desired dimension.

A further object of the invention, ancillary to the foregoing object, is to provide spring means of a relatively simple but reliable nature for providing the loading of the slide or frame.

Still another object of the invention is to provide substantial, though simple and effective guide means for the vertically movable measuring frame or slide, and a pivoted lever mounted in the base of the gauge for actuation of the mechanism by which the frame or slide is moved vertically, said lever being directly actuated by a screw having precision threads thereon and connected to the knob around which the auxiliary final precision measuring scale is positioned.

A still further object of the invention is to provide convenient, though simple and reliable means for initially and primarily positioning the frame or slide which carries the measuring finger with respect to the main, vertical scale, following which the final and precise reading obtained from the aforementioned rotatable knob is achieved.

One additional object of the invention is to provide stop means to limit the rotation of the knob upon which the precision measuring scale is provided, thereby greatly simplifying the obtaining of precise readings of the order of $1/1000$ of an inch or less as compared with devices presently in use and over which no improvement has been made in recent years with the exception of the present invention.

Details of the foregoing objects and of the invention, as well as other objects thereof are set forth in the following specification and illustrated in the drawings comprising a part thereof.

In the drawings:

FIG. 1 is a side elevation, shown in foreshortened manner to more conveniently adapt the same to the drawing sheet, of a direct-reading height gauge embodying the principles of the present invention.

FIG. 2 is a vertical plan view of the height gauge shown in FIG. 1.

FIG. 3 is a fragmentary vertical elevation, on a larger scale than employed in FIG. 1, and illustrating details of the main vertical scale, the vertically movable frame carrying the indicating finger, and a portion of the mechanism by which a primary reading of a given height is achieved with respect to said frame.

FIG. 4 is a transverse sectional view as seen on the line 4—4 of FIG. 3.

FIG. 5 is a perspective view illustrating, in full lines, an actuating member by which the primary reading is achieved by the indicator frame and, in phantom, a fragmentary portion of a latching member is shown in cooperation with said actuating member.

FIG. 6 is a top plan view of the base of the gauge but, in this view, the vertically movable frame or slide for the indicating finger is not present.

FIG. 7 is a partially sectioned vertical view of the base structure shown in FIG. 6.

FIG. 8 is a transverse sectional view as seen on the line 8—8 of FIG. 7.

FIG. 9 is a transverse sectional plan view as seen on the line 9—9 of FIG. 7.

FIG. 10 is a vertical sectional view as seen on the line 10—10 of FIG. 7.

FIG. 11 is a fragmentary vertical elevation of the principal portions of the gauge, part of the base being broken away to expose the interior thereof to illustrate a variation in the relative positions of the various elements from that shown in FIG. 7.

Referring to the drawings, the direct reading height gauge embodying the principles of the present invention primarily comprises a base 10 intended to be set upon the working surface of an industrial surface plate 12, for example, or upon any other surface relative to which a precise distance is to be measured; a main scale 14 which is fixed at its lower end to one end of the base 10 by means of screws 16; a vertically movable member 18 which is in the nature of a rack and also extends upward from the said end of base 10 adjacent to the main scale 14; an indicator finger and frame slide assembly 20 which is mounted for vertical movement upon the rack member 18; and an actuating mechanism 22 which is carried by base 10 and is operable to achieve the final positioning of the indicator finger relative to an item being measured, supplementing the primary reading of the main scale by an auxiliary scale capable of determining the final reading in very fine increments, of the order of $1/1000$ of an inch or less.

The base 10 preferably is made of suitable material such as steel and, due to the size thereof illustrated in drawings, it will be seen that it is provided with sufficient mass, and corresponding weight, to solidly position the entire gauge assembly upon a reference surface relative to which a measurement is to be made, such as the work surface of an industrial surface plate 12. The indicator finger and frame assembly 20 comprises a slidable frame 24 which, in cross-section, as shown in FIG. 4, is C-shaped, the inner surfaces thereof being in close slidable engagement with the outer surfaces of the vertical rack member which, for ease of reference hereinafter will simply be referred to as rack 18.

Projecting laterally outward from the edge of the slidable frame 24, opposite the base 10, is a hardened reference point 26 which, preferably is accurately connected to frame 24 with respect to reference measuring line 28 which is adjacent the measuring indicia 30 on scale 14. For purposes which will be described hereinafter but only by way of example, the individual indicia 30 preferably are accurately spaced apart vertically $\frac{1}{10}$ of an inch. Any other measuring system such as metric or otherwise however, as well as any appropriate increments thereof, may be employed with suitable spacing of the indicia being used.

Particularly as will be seen from FIG. 4, the vertically movable rack 18 is provided with a relatively shallow, rectangular recess 32 which extends longitudinally of member 18 from the lower end thereof, to the top. Said recess receives, in close slidable relationship, the main scale 14. The scale however, as will be further seen from FIG. 4, is of sufficient thickness that it also extends between the opposing flanges 34 of the slidable frame 24, preferably in close sliding relationship, whereby the face of scale 14 preferably is substantially flush with the outer surfaces of the flanges 34. Accordingly, reference line 28 on the outer face of one of the flanges 34 is closely contiguous to the indicia 30 on main scale 14.

The lower end of the rack 18 is vertically movable relative to base 10, such movement being guided principally by scale 14 which is fixed to base 10 and is disposed within longitudinal recess 32 of member 18. Vertical movement of the rack 18 relative to base 10 is accomplished by mechanism to be described in detail hereinafter. Such movement relative to base 10 also is guided by means of the lower end of the rack 18 being disposed in rectangular recess or slot 36 which is best shown in FIGS. 6 and 8. The purpose of such movement is to enable the actuating mechanism 22 to cause the auxiliary scale carried thereby to function and perform the final, precise measuring of distances of the reference point 26 relative to the base 10 and the reference surface upon which the base is disposed, as is to be described hereinafter in greater detail.

The slidable frame 24 is movable upon rack 18 and main scale 14 to achieve primary measurement ultimately to be precisely accomplished by reference point 26, such primary measurement being within $\frac{1}{10}$ of an inch, for example. To enable such primary measurement to be accomplished quickly, one edge of the rack 18 is provided with a series of notches 38 which, preferably, are shaped somewhat similarly to gear teeth, for reception therebetween of latching detent 40 which is carried by the slidable frame 24 and is operable by mechanism now to be described.

It is to be understood that various types of actuating means, as well as supporting means for the latching detent 40 may be provided. A relatively simple but satisfactory and reliable means illustrated in the drawings comprises the provision of latching detent 40 on one end of a leaf spring 42, the principal portion of which is disposed at a right angle to the detent 40 and is received within a shallow recess 44 formed in the vertical rear wall of frame 24. Cam 46 is carried by frame 24 within a suitable complementary opening for movement about a substantially horizontal axis which is transverse to the plane of rack 18, there being an actuating lever 48 extending preferably upward from one end of cam 46 and terminating at its upper end in a finger blade 50 which preferably has a hole 52 therein to permit access to screw 54 by which leaf spring 42 is secured to frame 24.

Further to facilitate the ready vertical movement of frame 24 and its reference point 26 relative to rack 18 and scale 14, the outer face of the upwardly extending portion of the indicator finger 56 of point 26 is provided with a finger-receiving recess 58, whereby, for example, the index finger of the operator may be disposed within the recess 58, while his thumb engages the finger blade 50 of actuating lever 48, or vice versa. Upon depressing said lever, detent 40 is withdrawn from the particular notch 38 within which it has been disposed and the frame 24, with its reference point 26 then is free to be moved vertically upon rack 18 so as to bring the lower surface or pointed end of reference point 26 nearly into contact with the surface to be measured.

By way of practical example, in FIG. 1, an exemplary workpiece 60 is illustrated, having a surface 62, the distance of which above the surface plate 12 is desired to be known. When the measuring or reference point 26 is nearly in contact with surface 62, the finger blade 50 is at least partially released by the operator and, further lowering movement of the frame 24 and point 26 takes place slowly and cautiously until the detent 40 drops into the next notch 38. This will dispose the reference measuring line 28 adjacent one of the indicia 30 of main scale 14. However by following this technique and under most circumstances, the reference point 26 will not quite be in engagement with the surface 62 to be measured. At this time the actuating mechaninsm 22 is operated to achieve the final, precise measuring of the distance required, by means of the mechanism now to be described, together with its function.

Referring particularly to FIGS. 6 through 10, it will be seen that the base 10 is provided with a recess 64 extending upward from the bottom thereof to accommodate a lever 66, one end of which is pivotally connected by a pin 68 which extends transversely of the base adjacent one end thereof, one end of said pin being accessible from one exterior side of the base as shown in FIG. 1. The opposite end of the lever 66 is provided with a specially shaped detent 70, best shown in FIGS. 7 and 8, whereby from FIG. 7 particularly, it will be seen that the lower surface of detent 70 is shaped somewhat to resemble the contour of an involute gear tooth, for purposes to be described. The lower end of vertical movable rack 18 is provided with a rectangular recess 72 which accommodates detent 70 as is obvious from FIG. 7. One wall of recess 72 also defines one surface of a lug 74 on the lower end of rack 18, the opposite surface of said lug being engaged by the upper surface of a loading means comprising preferably, a generally rectangular leaf spring 76 which fits against parallel shoulders 78 in an enlarged outer end portion of recess 64 within base 10, as best shown in FIG. 10. Two or more screws 80 serve to retain the spring securely to base 10 and especially the actuating end 82 thereof against the lower surface of lug 74 on rack 18.

The upper surface of base 10 also preferably is provided with a shallow circular recess 84, the base of said recess being intersected by a precisely threaded hole 86 which receives a correspondingly precisely threaded stem 88 which is fixed to and depends from a rotatable knob 90.

The terminal end of threaded stem 88 is provided preferably with a hardened flat surface. A contact point 92 is provided intermediately of the ends of lever 66. The contact point 92 engages the lower surface of stem 88, whereby when the stem 88 is rotated in a direction to move against lever 66, it will depress the detent 70 on the freely movable outer end thereof which is disposed against lug 74 of rack 18, correspondingly moving the rack 18 vertically downward relative to base 10, and against the action of the spring 76.

Surrounding the periphery of knob 90, as shown in FIG. 1, is an auxiliary scale 94, said scale extending around said periphery for approximately 90%, more or less, of its entire circumference, said scale preferably having 100 indicia thereon, appropriately labeled by numerals, as shown in FIG. 1.

The reason for having the scale extend around the periphery of knob 90 for approximately only 90% of its circumference is that it is preferred that suitable stop means be provided to limit the rotation of knob 90 to no more than a single revolution. One expedient form of stop means comprises a stop pin 96 which extends upwardly from the base of recess 84 and is fastened into base 10 for example, and the upper end thereof being disposed within an annular groove 98 which extends inward from the lower surface of knob 90 as clearly shown in FIGS. 6, 7, 9 and 10.

For purposes of enabling the knob 90 to be adjusted about its axis relative to the threaded stem 88, but be secured thereto when suitably oriented, as when the auxiliary scale 94 is being adjusted relative to reference line 100 shown in FIGS. 1, 2 and 6, a set screw 102 is threaded transversely into said knob, as readily can be seen from FIGS. 6, 7, 9 and 10, the inner end thereof engaging the upper portion of stem 88. The vertical position of set screw 102 is such that it intersects the annular groove 98 and also contacts the upper portion of stop pin 96, thus limiting rotation of the knob 90 to approximately 90% of a complete revolution.

In the preferred construction and arrangement of the gauge comprising the invention, the automatic loading means comprising the specifically illustrated leaf spring 76 is under tension when the auxiliary scale 94 is set at zero relative to the reference line 100 on base 10. Thus, in accordance with the preferred principles of the invention, the force exerted by the loading means 76 determines the vertical position of rack 18 and, correspondingly, of the slidable frame 24 and its reference point 26 at all times during normal operation of the device. Under some circumstances, reference point 26 may unintentionally rest sufficiently upon a surface being measured that said surface will assume most of the weight of said vertically movable mechanism but this is not in accordance with best practice.

After the primary measuring is accomplished, within $\frac{1}{10}$ of an inch, for example, by disposing the slidable frame 24 at such position on vertical rack 18 that the detent 40 of the latching mechanism is disposed within the notch 38 which will position the measuring surface of reference point 26 closest to the item to be measured without engaging it, the actuating mechanism 22 is then operated to make use of the auxiliary scale 94.

As stated above, scale 94 is divided, for example, but without restriction, into 100 precisely spaced increments and, especially by selecting a suitable diameter for the knob 90 and correspondingly appropriate circumference for the knob 90 that the spacings of the individual indicia of said scale readily can be observed and read by an operator with respect to reference line 100, said individual indicia are designed to represent $\frac{1}{1000}$ of an inch of vertical movement of the reference point 26 relative to base 10 as caused by the actuation of lever 66 against rack 18 in opposition to the force exerted by the loading spring 76. To accomplish this, the lead of the threads on stem 88 and the complementary female threads in hole 86 are so designed and selected that a single rotation of the knob 90 through the limit of movement of the circumference defined by the scale 94 with respect to reference line 100, as controlled by stop pin 96 and set screw 102, will move rack 18 and reference point one-tenth of an inch vertically. The foregoing calculation of the lead of said threads takes into account the fact that detent 92 on lever 66 engages stem 88 intermediately of the ends thereof.

By orienting auxiliary scale 94 with respect to its reference line 100, it will be seen that the set screw 102 conveniently may be loosened to permit ready rotation of knob 90 relative to threaded stem 88 to accomplish such orientation, following which the set screw 102 again is tightened and the mechanism has completely been oriented.

From the foregoing, it will be seen that the final, precise measurement of distances by the above-described direct-reading height gauge depends upon precise movement of the indicator finger and its frame assembly with respect to the stationary main scale 14 which is disposed vertically. In accordance with the preferred principles of the invention, the main scale 14 also incidentally comprises effective guide means for such vertical movement of the rack 18 of the said indicator finger and frame assembly, especially in view of the rectangular recess 36 provided in base 10. However, with respect to the upper ends of rack 18 and main scale 14, suitable additional guide means are provided in the form of a retaining cap screw 104 which is threaded into the main scale 14, for example, as shown in FIG. 2. Said screw extends through a short vertical slot 106 formed in rack 18 and, preferably, the head of the screw 104 and the recessed surfaces of the slot 106 engaged thereby are complementary to each other. The length of the slot 106 need only be several tenths of an inch, for example, inasmuch as the intended maximum vertical movement of the rack 18 relative to main scale 14 is not intended to exceed $\frac{1}{10}$ of an inch in accordance with normal operation of the gauge.

For purposes of exemplifying and enabling a ready understanding of the operation of the gauge comprising the invention, it will be seen that in the setting of the slidable frame 24 in FIG. 1 with respect to main scale 14, the reference measuring line 28 is substantially opposite one of the indicia 30. However, in FIG. 11, it will be seen that the auxiliary scale 94 is disposed intermediately of the ends with respect to reference line 100 and, correspondingly, reference line 28 on frame 24 is intermediately of two adjacent measuring indicia 30 on main scale 14.

From the above description, it will be seen that the direct reading height gauge comprising the present invention permits a quick, primary measurement setting of a vertically movable reference point 26 with respect to a main scale having relatively widely spaced indicia which easily can be read by an operator, these for example being of the order of $\frac{1}{10}$ of an inch. Following such primary positioning of the reference point or member with respect to a workpiece, the height of which is to be measured for example, final and precise measurement of the desired distance, within $\frac{1}{1000}$ of an inch or less is made possible by no more than a single rotation of an actuating member comprising a rotatable knob upon which an auxiliary scale is mounted for purposes of precisely measuring in very small increments thereof, one of the increments of distance between two adjacent indicia on the main scale. Accuracy is assured primarily through the provision of automatically operable loading means in the base of the gauge for purposes of always exerting pressure upon the mechanism which moves the indicator finger vertically. Further, notwithstanding the fact that the actuating mechanism 22, which moves the reference point 26 vertically against the force exerted by the loading means 76, engages lever 66 intermediately of the ends thereof, whereby vertical movement of the actuating detent 70 on the free end of the lever will engage the lug 74 on the rack 18 at very slightly transversely displaced locations as the vertical movement occurs, even such infinitesimal inaccuracy as might otherwise occur in the measurement recorded by auxiliary scale 94 is prevented due to the special shape of the lower surface of detent 70 which engages the upper surface of lug 74 of vertically movable rack 18, the same being, as indicated above, somewhat in the nature of the shape of one side of involute gear teeth, thereby affording at least, partially, a rolling action as distinguished from a solely sliding action.

While the invention has been described and illustrated in its several preferred embodiments, it should be understood that the invention is not to be limited to the precise details herein illustrated and described since the same may be carried out in other ways falling within the scope of the invention as claimed.

We claim:

1. A precision height gauge comprising a base, a main scale fixed to and extending vertically upward from said base; an indicator finger and frame assembly slidably movable longitudinally relative to said main scale and comprising, an indicator finger, elongated means substantially coextensive in length with said scale and having regularly spaced notches therein, said elongated means being movable longitudinally adjacent and relative to said main scale, guide means in said base engaging the lower end of said elongated means and supporting the same for accurate vertical movement relative to said base, additional guide means at the upper ends of said scale and elongated means operable to cooperate with said guide means in said base to maintain said scale and elongated member in vertically movable relationship relative to each other, frame means slidable longitudinally upon said elongated means and supporting said indicator finger, latching means on said frame means engageable selectively with said regularly spaced notches in said elongated means to indicate uniform increments of measurement with respect to which said indicator finger is setable for a primary measurement; loading means supported within said base and engaging the lower end of said elongated means and operable automatically to load it for upward vertical movement; manually operable means interengageable with and operable to move said elongated means and assembly carried thereby downwardly relative to said base against the action of said loading means; and direct reading auxiliary scale means on said manually operable means to indicate visually very small increments of vertical movement of said elongated means relative to said base to supplement measurements afforded by said uniform increments of primary measurement on said elongated means.

2. The precision height gauge set forth in claim 1 further characterized by said manually operable means comprising a screw having a knob on one end and rotatable about a vertical axis relative to said base, and said auxiliary scale being carried by the periphery of said knob.

3. The precision height gauge set forth in claim 1 further characterized by said loading means comprising a leaf spring fixed at one end to said base and the other end directly engaging said elongated means and operable to urge the same and said indicator finger and frame assembly carried thereby in upward vertical direction.

4. The precision height gauge set forth in claim 1 further including a lever pivotally mounted within the base of said gauge and engaging the lower portion of said vertically movable elongated means, and said manual means comprising a screw carried by means of threads of fine pitch by said base and engaging said lever to cause it to move said vertically movable elongated means in opposition to said loading means.

5. The precision height gauge set forth in claim 4 further characterized by said loading means comprising a leaf spring fixed at one end within said base and engaging the lower portion of said vertically movable elongated means to move the same in opposition to said screw.

6. The precision height gauge set forth in claim 1 in which said main scale is flat and strip-like and said elongated means is relatively flat and slidably adjacent one flat surface of said main scale.

7. The precision height gauge set forth in claim 1 further characterized by said manually operable actuating means for said elongated means comprising a lever pivotally supported at one end in said base and at its other end engaging the lower end portion of said elongated means, and a screw threadably supported by said base and engaging said lever intermediately of its ends and operable to move the same in opposition to said loading means.

8. The precision height gauge set forth in claim 7 further characterized by said screw having a manually engageable knob thereon, said auxiliary scale being carried by said knob.

9. The precision height gauge set forth in claim 8 further including stop means engageable by said knob and operable to limit the movement thereof to no more than a single revolution.

10. The precision height gauge set forth in claim 1 further characterized by said latching means comprising a spring having a latching detent thereon, a manually operable lever, and cam means actuated by said lever and operable to move said detent away from said notches.

References Cited by the Examiner

UNITED STATES PATENTS

| 1,289,946 | 12/1918 | Sorby | 33—170 |
| 1,397,189 | 11/1921 | Westerberg | 33—169 |
| 2,569,558 | 10/1951 | Cormier | 33—169 |
| 2,645,026 | 7/1953 | Trbojevich | 33—174 |

FOREIGN PATENTS

| 575,031 | 1/1946 | Great Britain. |
| 746,119 | 3/1956 | Great Britain. |
| 17,654 | 5/1904 | Sweden. |

ISAAC LISANN, *Primary Examiner.*